United States Patent
Rakkolainen et al.

(10) Patent No.: US 12,053,928 B2
(45) Date of Patent: Aug. 6, 2024

(54) STEREOLITHOGRAPHY APPARATUS

(71) Applicant: PLANMECA OY, Helsinki (FI)

(72) Inventors: Tero Rakkolainen, Helsinki (FI); Juha Koivisto, Helsinki (FI)

( * ) Notice: Subject to any disclaimer, the term of this patent is extended or adjusted under 35 U.S.C. 154(b) by 64 days.

(21) Appl. No.: 17/256,391

(22) PCT Filed: Jun. 27, 2019

(86) PCT No.: PCT/FI2019/050505
§ 371 (c)(1),
(2) Date: Dec. 28, 2020

(87) PCT Pub. No.: WO2020/002775
PCT Pub. Date: Jan. 2, 2020

(65) Prior Publication Data
US 2021/0146620 A1 May 20, 2021

(30) Foreign Application Priority Data
Jun. 28, 2018 (FI) .................................... 20185586

(51) Int. Cl.
*B29C 64/291* (2017.01)
*B29C 64/129* (2017.01)
(Continued)

(52) U.S. Cl.
CPC .......... *B29C 64/291* (2017.08); *B29C 64/129* (2017.08); *B29C 64/286* (2017.08); *B33Y 30/00* (2014.12)

(58) Field of Classification Search
CPC ... B29C 64/129; B29C 64/264; B29C 64/286; B29C 64/291; B29C 2035/0827;
(Continued)

(56) References Cited

U.S. PATENT DOCUMENTS

2007/0263298 A1* 11/2007 El-Ghoroury ........ G03B 21/208
359/838
2012/0218542 A1* 8/2012 Ichizawa ............ G01N 21/3554
356/51
(Continued)

FOREIGN PATENT DOCUMENTS

CN 202013486 U 10/2011
CN 206589338 U 10/2017
(Continued)

OTHER PUBLICATIONS

Machine translation of JPH09207228A, Goto, Aug. 1997.*
International Search Report for PCT Application No. PCT/FI2019/050505, Mailed Sep. 25, 2019, 4 pages.

*Primary Examiner* — Philip C Tucker
*Assistant Examiner* — Jimmy R Smith, Jr.
(74) *Attorney, Agent, or Firm* — Lippes Mathias LLP (57) ABSTRACT

A stereolithography apparatus (100) has an exposure arrangement (110), comprising a radiative element (120); a masking element (130), having a substantially rectangular masking area (132); an optical path (140) between the radiative element (120) and the masking area (132), having a linear segment (145); and an intensity-unifying arrangement (150), having a first, a second, a third, and a fourth reflective surface (152$_1$, 152$_2$, 152$_3$, 152$_4$) The first and second reflective surfaces (152$_1$, 152$_2$,) are arranged on opposite sides of the linear segment (145), and the third and fourth reflective surfaces (152$_3$, 152$_4$) are arranged on opposite sides of the linear segment (145). In a cross section of the intensity-unifying arrangement (150) along any plane, perpendicularly intersecting the linear segment (145), the reflective surfaces (152$_1$, 152$_2$, 152$_3$, 152$_4$) follow a boundary (156) of a rectangle.

15 Claims, 3 Drawing Sheets

(51) Int. Cl.
*B29C 64/286* (2017.01)
*B33Y 30/00* (2015.01)

(58) Field of Classification Search
CPC ............ B29C 2045/0075; B29C 33/06; B29C 35/0805; B33Y 10/00; B33Y 30/00; G02B 19/0023; G02B 19/0061
See application file for complete search history.

(56) References Cited

U.S. PATENT DOCUMENTS

2016/0200042 A1* 7/2016 Jeng ..................... B29C 64/124
264/494
2018/0195684 A1* 7/2018 Vissenberg ............. F21V 13/10

FOREIGN PATENT DOCUMENTS

| EP | 2346669 B1 | 4/2010 | |
|----|----|----|----|
| FR | 3004815 A1 | 10/2014 | |
| JP | H08142203 A | 6/1996 | |
| JP | H08281810 A | 10/1996 | |
| JP | H109207228 A | 8/1997 | |
| JP | 2006326970 A | 12/2006 | |
| JP | 2010122581 A | 6/2010 | |
| WO | WO-2013154837 A1 * | 10/2013 | ........... G02B 5/0215 |
| WO | 2015111800 A1 | 7/2015 | |
| WO | 2016146185 A1 | 9/2016 | |

* cited by examiner

STEREOLITHOGRAPHY APPARATUS

FIELD OF THE INVENTION

The invention concerns the technology of stereolithographic 3D printing, also known as stereolithographic additive manufacturing. In particular, the invention concerns stereolithography apparatuses with photomask-based exposure arrangements.

BACKGROUND OF THE INVENTION

Stereolithography is a 3D printing or additive manufacturing technique in which optical radiation is used to photopolymerize suitable raw material to produce the desired object. The raw material comes to the process in the form of a resin. A vat is used to hold an amount of resin, and a build platform is moved in the vertical direction so that the object to be produced grows layer by layer onto a build surface of the build platform. The optical radiation used for photopolymerizing may come from above the vat, in which case the build platform moves downwards through the remaining resin as the manufacturing proceeds. The present description concerns in particular the so-called "bottom up" variant of stereolithography, in which the photopolymerizing optical radiation comes from below the vat and the build platform moves upwards away from the remaining resin as the manufacturing proceeds.

In stereolithography apparatuses, optical radiation may be provided by various types of exposure arrangements, e.g., laser-scanning devices, image-projection devices or photomask-based exposure arrangements. Generally, stereolithography apparatuses with photomask-based exposure arrangements may provide high build rates and printing resolution.

In conventional photomask-based exposure arrangements, an array of radiative elements is provided in close proximity to a rectangular photomask, and optical radiation emitted by the array of radiative elements is transmitted through the photomask in order to produce sequential optical intensity patterns inside the vat for fabricating the desired object, layer by layer, from the resin.

In such arrangements, the array of radiative elements commonly produces a spatially varying optical intensity distribution throughout the extent of the photomask. To fabricate the desired object without defects, the optical intensity distribution should preferably be made more uniform. This may be achieved, for example, by the provision of additional intensity-unifying elements between the array of radiative elements and the photomask. Such intensity-unifying elements may be provided, for example, in the form of a filter that exhibits a spatially varying optical transmittance, which is complementary to the optical intensity distribution produced by the array of radiative elements, and/or a diffuser based on scattering the optical radiation produced by the array of radiative elements.

However, provision of intensity-unifying elements may induce noticeable optical losses, decreasing total power of optical radiation transmitted through the photomask and reducing energy efficiency of stereolithography apparatuses comprising such elements. Moreover, in order to properly utilize such elements, it may be necessary to provide the array of radiative elements and/or the intensity-unifying elements in close proximity to the photomask. This may lead to issues related to the heating up of the photomask and/or the resin.

In light of both of the aforementioned challenges, it may be desirable to devise structural solutions that would provide a uniform optical intensity distribution throughout the extent of a rectangular photomask, without inducing major optical losses and/or resulting in excessive heating of the photomask and/or the resin.

SUMMARY

The invention relates to a stereolithography apparatus, having an exposure arrangement, comprising a radiative element, for emitting optical radiation; a masking element, having a substantially rectangular masking area, for forming an exposure pattern by partially masking optical radiation from the radiative element; an optical path between the radiative element and the masking area, the optical path having a linear segment; and an intensity-unifying arrangement, having a first, a second, a third, and a fourth reflective surface. The first and second reflective surfaces are arranged on opposite sides of the linear segment, and the third and fourth reflective surfaces are arranged on opposite sides of the linear segment. The reflective surfaces are configured to collect optical radiation from the radiative element, propagating obliquely with respect to the linear segment, onto the masking area. For each of the reflective surfaces, a distance, perpendicularly measurable from the linear segment, is non-decreasing with increasing distance along the optical path from the radiative element. In a cross section of the intensity-unifying arrangement along any plane, perpendicularly intersecting the linear segment, the reflective surfaces follow a boundary of a rectangle.

In an embodiment, the radiative element comprises a radiation source, such as a substantially Lambertian radiation source, having a radiation pattern with a full-width at half-maximum (FWHM) angle in a range from 110° to 130°, for example, approximately 120°.

In an embodiment, the masking element comprises a liquid crystal element.

In an embodiment, the liquid crystal element is a transmissive liquid crystal element.

In an embodiment, the optical path is substantially linear.

In an embodiment, the optical path perpendicularly intersects a center of the masking area.

In an embodiment, the first and second reflective surfaces are substantially planar.

In an embodiment, a cross section of the third and fourth reflective surfaces along a plane, extending parallel to the linear segment and perpendicular to the third and fourth reflective surfaces, has a shape of a part of a conic section, e.g., a circle, ellipse, parabola, or a hyperbola.

In an embodiment, any of the reflective surfaces comprises a metal, e.g., aluminum, iron, and/or silver.

In an embodiment, the boundary of a rectangle has two mutually perpendicular symmetry planes with an intersection alone the linear segment.

In an embodiment, each of the reflective surfaces is arranged on an inner boundary surface of a hollow body.

In an embodiment, each of the reflective surfaces is arranged on an outer boundary surface of a solid body.

In an embodiment, the radiative element comprises a square radiation source with a size of approximately 25 mm×25 mm, having a radiation pattern with a full-width at half-maximum (FWHM) angle of approximately 120°. The masking element comprises a transmissive liquid crystal element, having a rectangular masking area with a size of approximately 75 mm×150 mm. The optical path is substantially linear, has a length of approximately 100 mm, and perpendicularly intersects a center of the radiative element and a center of the masking area. The reflective surfaces extend continuously between two planes perpendicular to the linear segment, the two planes positioned approximately at x=9 mm and x=109 mm. The first and second reflective surfaces are substantially planar, each thereof forming a smaller supplementary angle α with the linear segment of approximately 15°, and a distance between the first and second reflective surfaces at x=9 mm is approximately 25 mm. Further, a cross section of the third and fourth reflective surfaces along a plane, extending parallel to the linear segment and perpendicular to the third and fourth reflective surfaces, has a shape of a part of a conic section, presentable in parametric form with a radius of curvature R of the conic section at x=0 in a range from 6 mm to 9 mm, preferably approximately 7 mm, and a conic constant e in a range from −1.30 to −1.55, preferably approximately −1.35.

It is to be understood that the embodiments of the invention described above may be used in any combination with each other. Several of the embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIGS. 1 to 5 are not drawn to scale. Like reference signs refer to corresponding elements throughout this specification.

DETAILED DESCRIPTION

Concerning the stereolithography apparatuses discussed in this detailed description, the following shall be noted.

A stereolithography apparatus can also be called a stereolithographic 3D printer, or a stereolithographic additive manufacturing apparatus. A stereolithography apparatus may be a 3D printer for fabrication of dental objects. It may be a 3D printer for creating dental splints, models, surgical guides, temporary fillings, and orthodontic models with true precision and efficiency. Additionally or alternatively, a stereolithography apparatus may be a 3D printer for fabrication of any stereolithographically 3D-printable objects other than dental objects.

Further, a stereolithography apparatus may comprise any of a controller, a reader(s) and/or sensor(s) block, a data interface, a user interface, a power block, a base part, a lid, a lid mechanism, a vat, a build platform, a build platform mechanism, a resin delivery mechanism, a resin heater part, an exposure arrangement, and an exposure arrangement cooler part or any other parts and/or structures necessary and/or beneficial for the operation of the stereolithography apparatus. However, many of the aforementioned features are out of the scope of this description and are, therefore, omitted herein.

Figure 1:
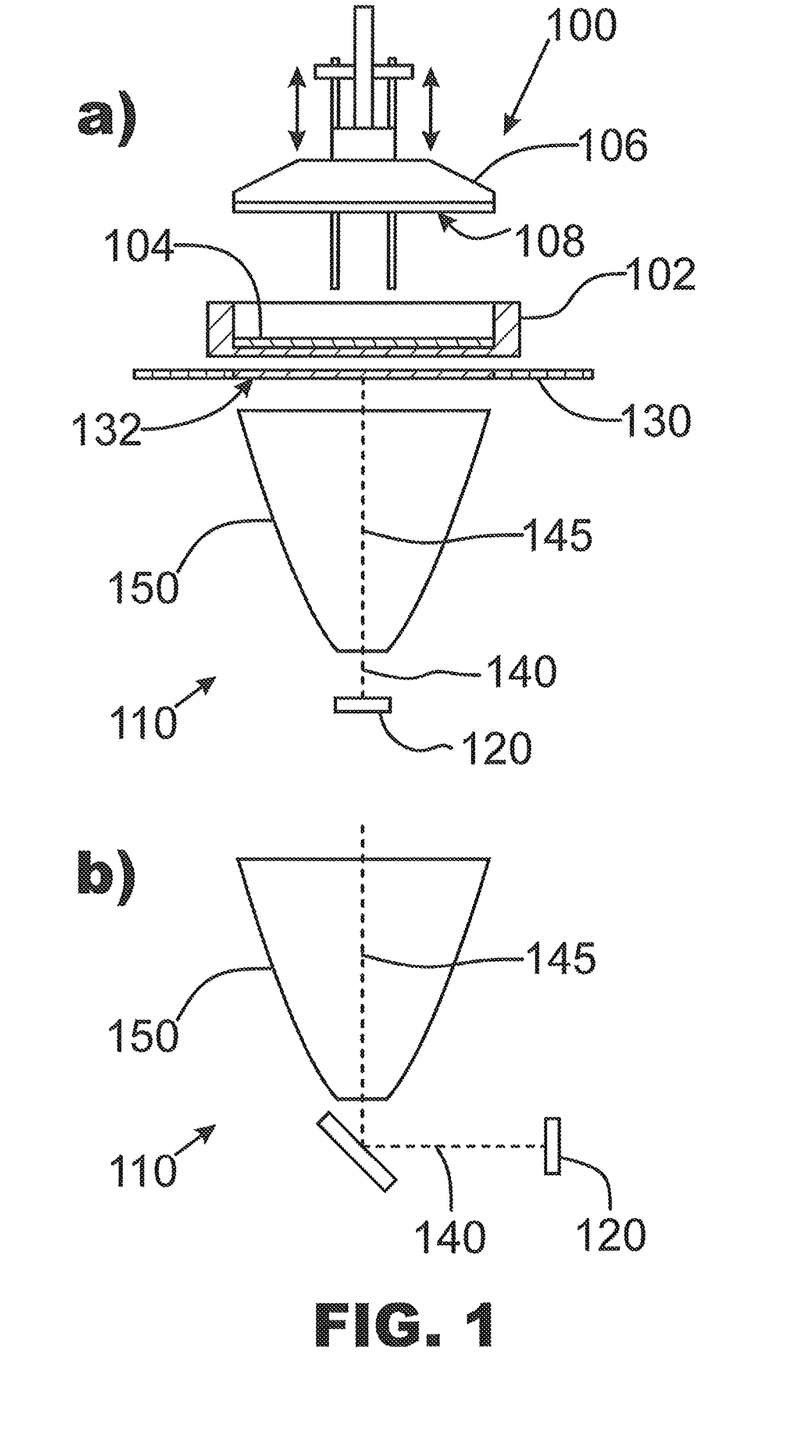
FIG. 1 shows selected parts of stereolithography apparatuses.

FIG. 1 illustrates examples of stereolithography apparatuses 100. Only selected parts of the stereolithography apparatuses 100 are shown. Although not explicitly shown in FIG. 1, the embodiment of FIG. 1b may generally comprise any features and/or elements of the embodiment of FIG. 1a, which are omitted from FIG. 1b.

With reference to FIG. 1a, a vat 102 is provided for holding resin for use in the stereolithographic 3D printing process. A build platform 106 with a build surface 108 is supported above the vat 102 so that the build surface 108 faces the vat 102. The bottom of the vat. 102 is or can be selectively made transparent or translucent for the kind of optical radiation used for photopolymerizing the resin.

A build platform mechanism is provided and configured to move the build platform 106 in a working movement range between first and second extreme positions. Of these, the first extreme position is the one proximal to the vat 102, and the second extreme position is the one distant from the vat 102. In the first extreme position, the build surface 108 may be very close to or in contact with the bottom of the vat 102. The first layer of the object to be manufactured will be photopolymerized onto the build surface 108 when the build platform 106 is in or close to the first extreme position so that the distance between the build surface 108 and the bottom of the vat 102 is in the order of the thickness of one layer in the stereolithographic 3D printing process.

In general, a build platform mechanism may comprise mechanical and electrical parts that serve to move a build platform between its first and second extreme positions. A build platform mechanism may also comprise support structures that serve to ensure correct angular positioning of the build platform. In a practical implementation, a support of a build platform may comprise various advanced technical features, like joints and/or fine tuning mechanisms for ensuring that the orientation of a build surface is appropriate. However, such features are out of the scope of this description and are, therefore, omitted herein.

The position shown in FIG. 1a may be the second extreme position, or at least closer to the second extreme position than to the first extreme position. A working region of the stereolithography apparatus 100 may be said to exist between the vat 102 and the second extreme position of the build platform 106, because the object to be manufactured will appear within this region. The build platform 106 does not need to move up to or even close to the second extreme position during the manufacturing of an object; the second extreme position may be most useful for making it easier to detach a complete manufactured object from the build platform 106.

The stereolithography apparatus 100 of FIG. 1a comprises an exposure arrangement 110 comprising a radiative element 120 suitable for emitting optical radiation. The optical radiation is preferably suitable for causing selective photopolymerization of resin during a stereolithographic 3D printing process. Wavelength spectrum and intensity of the optical radiation may be selected based on the type of resin used for the stereolithographic 3D printing process.

A "radiative element" may refer to an element which may form, as such, a complete, operable source of optical radiation. Alternatively, a radiative element may be used as one element of a complete radiative assembly comprising also other elements, units, and/or structures.

A radiative element may comprise any type of radiation source, e.g., an incandescent or other thermal radiation source, a luminescent radiation source, and/or an electric arc or a gas discharge lamp. In a preferred embodiment, a radiative element comprises a light-emitting diode (LED)

source. Said LED source may comprise one LED element or a plurality of LED elements, for example, an array of LED elements.

Said radiation source may be substantially Lambertian, i.e., the radiation source may obey Lambert's cosine law. Additionally or alternatively, the radiation source have a radiation pattern resembling the radiation pattern of a Lambertian source, having a full-width at half-maximum (FWHM) angle in a range from 110° to 130°, for example, approximately 120°. In a preferred embodiment, a radiative element comprises a LED source with an array of LED elements, having a FWHM angle of approximately 120°.

In the embodiment of FIG. 1a, the exposure arrangement 110 also comprises a masking element 130, having a substantially rectangular masking area 132, for forming an exposure pattern by partially masking optical radiation from the radiative element 120.

A "masking area" may refer to a part of a surface of a masking element configured to receive and/or to be illuminated by optical radiation emitted by a radiative element. Additionally or alternatively, "masking area" may refer to a part of a surface of as masking element such that the masking element has spatially and/or temporally variable transmissive and/or reflective properties for optical radiation to be emitted by a radiative element and incident onto the art of the surface of the masking element.

A masking area may be partially or entirely definable based on a spatial intensity distribution of optical radiation to be emitted by a radiative element and incident onto the masking element. For example, a masking area may be definable as parts of at least one surface of a masking element, wherein intensity of optical radiation to be emitted by a radiative element is configured to be at least 50% of a maximum intensity of optical radiation to be emitted by the radiative element on the surface of the masking element.

A "substantially rectangular masking area" may refer to a projection of a masking area having a substantially rectangular shape on at least one plane. A substantially rectangular masking area may preferably be substantially planar. In this specification, the term "substantially rectangular" is used in a broad sense, comprising, for example, rectangles with rounded or beveled corners.

"Forming an exposure pattern by partially masking" may refer to configuring a masking element such that optical radiation emitted by a radiative element may propagate onto the masking area and, from the masking area, a part of the optical radiation may propagate further into a working region.

A masking element may comprise a sheet, plate, or film with spatially varying transmittance and/or reflectance for optical radiation emitted by a radiative element, forming at least a part of a masking area. The sheet, plate, or film may comprise a substrate material transparent or translucent to optical radiation emitted by the radiative element, e.g., glass, quartz, plastic, and/or sapphire, and a masking material, e.g., a metal and/or ink, on the substrate material for partially masking optical radiation emitted by the radiative element.

In the embodiment of FIG. 1a, the masking element 130 comprises a substantially rectangular transmissive liquid crystal element, an outer surface thereof acting as the masking area 182. In other embodiments, a masking element may comprise similar or other types of masking elements, e.g., reflective liquid crystal elements or digital micromirror devices. In embodiments comprising liquid crystal elements, any suitable liquid crystal device technology known in the art may be used.

A transmissive liquid crystal element may comprise, for example: a first polarizing filter for polarizing optical radiation, which is emitted by a radiative element and incident onto a masking area, along a first direction; a first substrate transparent for optical radiation emitted by the radiative element; a first plurality of transparent electrodes arranged onto the first substrate, shapes thereof at least partially defining exposure patterns producible in a working region; a twisted nematic liquid crystal layer; a second plurality of transparent electrodes, shapes thereof at least partially defining the exposure patterns producible in the working region; a second substrate transparent for optical radiation emitted by the radiative element, wherein the second plurality of transparent electrodes may be arranged onto the second substrate; and a second polarizing filter with its polarizing axis oriented perpendicular to the first direction.

In the embodiments of FIG. 1, the exposure arrangement 110 also comprises an optical path 140 between the radiative element 120 and the masking area 132.

As commonly known in the art, an "optical path" may refer to a path that optical radiation takes, while propagating through an optical medium or system. Consequently, an "optical path between a radiative element and a masking area" may refer to parts of an exposure arrangement being arranged such that at least some optical radiation from a radiative element may be incident onto a masking area. Generally, an exposure arrangement may comprise a plurality of optical paths between a radiative element and a masking area. An exposure arrangement may also comprise a plurality of optical paths between any of a plurality of radiative elements and any of a plurality of masking areas.

An exposure arrangement may comprise reflective optical components, mirrors and/or beamsplitters; refractive optical components, e.g., prisms and/or lenses; diffractive optical components, e.g., diffusers, gratings and/or Fresnel lenses; and/or fiber-optical components along an optical path. In some embodiments, an optical path may exist even if said components were to be removed from the stereolithography apparatus. In some embodiments, removal of said components may break an optical path. In such case, said components may be central to the operation of the exposure arrangement. In some embodiments, an exposure arrangement may comprise none of said components along an optical path.

In the embodiments of FIG. 1, the optical path 140 extends from a center of the radiative element 120 to a center or the masking area 132. In other embodiments, an optical path may extend from any point of a radiative element to any point on a masking area.

In the embodiment of FIG. 1a, the optical path 140 extends linearly between the radiative element 120 and the masking area 132. Another configuration is used in the stereolithography apparatus illustrated partially in FIG. 1b. In that embodiment, the optical path 140 is made non-linear by a reflective element changing the direction of light incident on it. In other embodiments, an optical path may be non-linear or linear. Here, the term "linear" may refer to an object that is arranged in or extending along a straight or nearly straight line or line segment.

In the embodiments of FIG. 1, the optical path 140 comprises a linear segment 145.

A "linear segment" of an optical path may refer to a part of the optical path between a radiative element and a masking area. If an optical path is non-linear, it may still comprise a substantially linear part. A linear segment may then comprise said linear part either partially or completely.

If an optical path is linear, the term "linear segment" may then refer either to the whole optical path or a part thereof.

In the embodiment of FIG. 1a, the optical path 140 intersects surfaces of the radiative element 120 and the masking area 132 perpendicularly. In other embodiments, an optical path may intersect a surface of a radiative element perpendicularly or obliquely. Additionally or alternatively, in some embodiments, an optical path may intersect a masking area perpendicularly or obliquely.

The stereolithography apparatuses of FIG. 1 comprise further an intensity-unifying arrangement 150 which may be in accordance with any of the intensity-unifying arrangements discussed below with reference to FIGS. 2 to 5.

Figure 2:
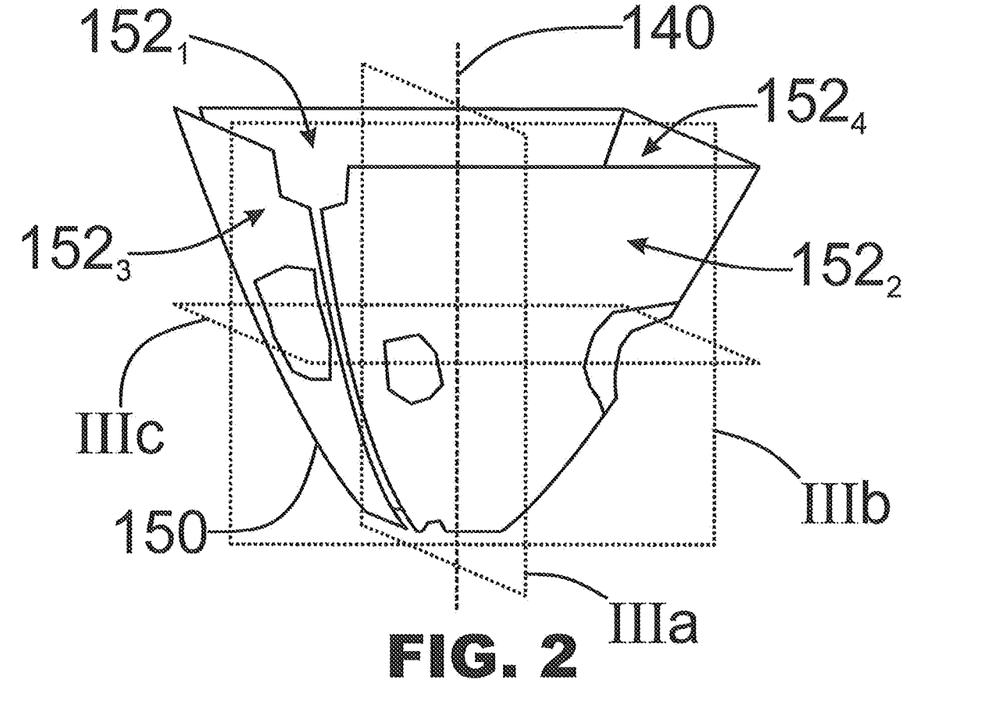
FIG. 2 depicts an intensity-unifying arrangement of a stereolithography apparatus.
Figure 3:
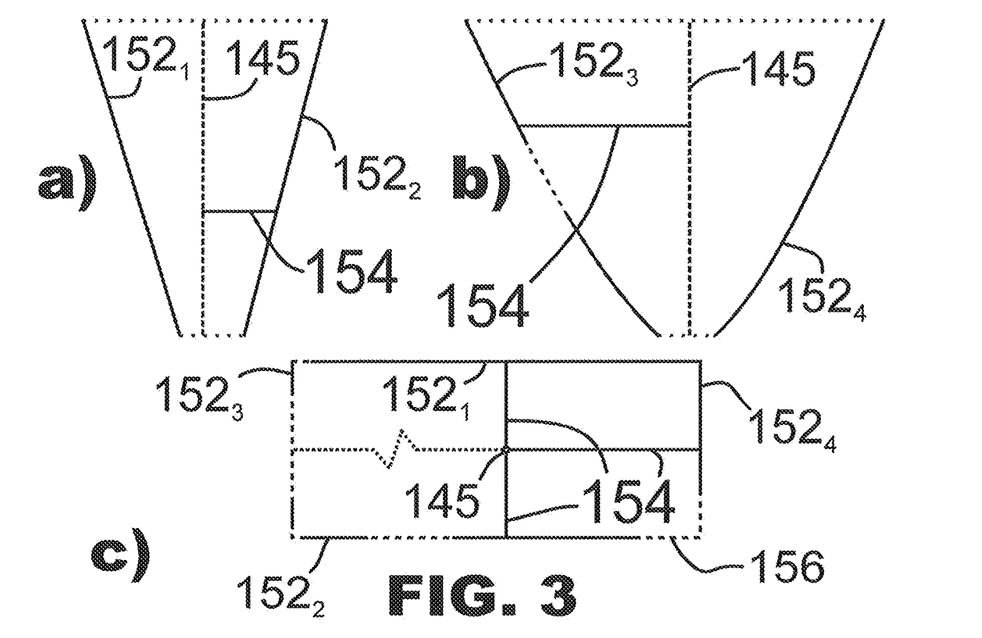
FIG. 3 illustrates cross sections of the intensity-unifying arrangement of FIG. 2 taken along planes IIIa, IIIb, and IIIc of FIG. 2.

In the embodiment of FIGS. 2 and 3, the exposure arrangement 110 comprises an intensity-unifying arrangement 150, having a first and a second reflective surface $152_1$, $152_2$ arranged on opposite sides of a linear segment 145 of the optical path 140, and a third and a fourth reflective surface $152_3$, $152_4$ arranged on opposite sides of the linear segment 145.

Here, a "surface" may refer to a finite part of a generalization of a plane, which may have a non-zero, possibly position-dependent curvature and which may preferably be smooth. Further, a surface may be connected, i.e., non-divisible into two disjoint sub-surfaces, or preferably path-connected. Some surfaces may be simply connected.

A "reflective surface" may refer to a surface that is configured to be able to specularly reflect at least a part, preferably a major part, of optical radiation to be emitted by a radiative element and incident onto the surface. For example, a reflective surface may be configured to specularly reflect at least 50%, preferably at least 70%, for example, at least 90% of optical power incident onto the reflective surface at a relevant wavelength range and at a certain angle. A reflective surface may additionally reflect some optical radiation, emitted by a radiative element and incident onto said surface, in a diffuse manner.

A reflective surface may reflect optical radiation emitted by a radiative element and incident onto said surface owing to a material composition of said surface comprising a reflective material, a metal (such as aluminum, silver, or iron) or by total-internal reflection.

A reflective surface may generally comprise a metal, aluminum, iron, and/or silver. A reflective surface may at least partially be fabricated by machining and/or bending a reflective or refractive material. At least one, preferably each, reflective surface may at least partially be fabricated by evaporating or sputtering a reflective material, e.g., a metal (such as aluminum or silver). A reflective surface may correspond to an outer surface of a metal coated by an organic and/or inorganic coating to prevent or slow down corrosion and/or abrasion of the metal.

Two reflective surfaces being arranged on "opposite sides of a linear segment of an optical path" may refer to neither of the two reflective surfaces intersecting a plane extending on the linear segment.

In the embodiment of FIGS. 2 and 3, the reflective surfaces $152_1$, $152_2$, $152_3$, $152_4$ are configured to collect optical radiation from a radiative element, propagating obliquely with respect to the linear segment 145 of the optical path 140, onto a masking area.

Collecting optical radiation from a radiative element, propagating obliquely with respect to a linear segment of an optical path, onto a masking area may provide a uniform optical intensity distribution throughout the masking area, without inducing major optical losses and/or resulting in excessive heating of the masking element and/or a resin.

Such provision of a uniform optical intensity distribution may be achievable by collecting optical radiation preferentially to peripheral parts of a masking area. Additionally or alternatively, provision of an intensity-unifying arrangement may enable arranging a masking area at a distance from a radiative element without inducing excessive optical losses.

A reflective surface may be contiguous with another reflective surface. For example, in the embodiment of FIGS. 2 and 3, the first reflective surface $152_1$ is contiguous with the fourth reflective surface $152_4$, and the fourth reflective surface $152_4$ is contiguous with both the first and the second reflective surface $152_1$, $152_2$.

Further, a reflective surface may be separated from other reflective surfaces. For example, the third reflective surface $152_3$ of the embodiment of FIGS. 2 and 3 is separated from each of the first, second, and fourth reflective surfaces $152_1$, $152_2$, $152_4$, sharing no common borders with any of said reflective surfaces.

A reflective surface may comprise through-holes. In the embodiment of FIGS. 2 and 3, the second, third, and fourth reflective surfaces $152_2$, $152_3$, $152_4$ comprise through-holes. In some embodiments, a reflective surface may have no through-holes. For example, the first reflective surface $152_1$ of the embodiment of FIGS. 2 and 3 has no through-holes.

In the embodiment of FIGS. 2 and 3, for each of the reflective surfaces $152_1$, $152_2$, $152_3$, $152_4$, a distance 154, perpendicularly measurable from the linear segment 145, is non-decreasing with increasing distance along the optical path 140 from a radiative element. Additionally, in a cross section of the intensity-unifying arrangement 150 along any plane perpendicularly intersecting the linear segment 145, the reflective surfaces $152_1$, $152_2$, $152_3$, $152_4$ follow a boundary 156 of a rectangle.

In one embodiment, for each reflective surface, a distance, perpendicularly measurable from a linear segment of an optical path, is increasing with increasing distance along the optical path from a radiative element.

In a preferred embodiment, a first direction, perpendicularly intersecting a linear segment, may be defined, and, in a cross section of an intensity-unifying arrangement along any plane, perpendicularly intersecting the linear segment, reflective surfaces of the intensity-unifying arrangement follow a boundary of a rectangle, having an edge extending parallel to the first direction.

In a preferred embodiment, in a cross section of an intensity-unifying arrangement along any plane, perpendicularly intersecting a linear segment, reflective surfaces of the intensity-unifying arrangement follow a boundary of a rectangle, the boundary of a rectangle having two mutually perpendicular symmetry planes with an intersection along the linear segment. This may, for example, enable directing optical radiation propagating substantially along the linear segment to a predetermined point on a masking area without inducing undue optical losses due to unnecessary reflections. This may be especially beneficial in case of a maximum radiant intensity of a radiative element coinciding with an optical path and/or the optical path intersecting a center of the masking area.

In a cross section of an intensity-unifying arrangement along any plane, perpendicularly intersecting a linear segment, reflective surfaces of the intensity-unifying arrangement "following a boundary of a rectangle" may refer to the cross sections forming at least a part of a boundary of a rectangle and not substantially extending away from the boundary of the rectangle; for example, not extending away from the boundary of the rectangle a distance longer than one tenth, preferably one percent, of a length of an edge of the rectangle.

In a cross section of an intensity-unifying arrangement along any plane, perpendicularly intersecting a linear segment, reflective surfaces of the intensity-unifying arrangement following a boundary of a rectangle may reduce an amount of optical radiation emitted by a radiative element by-passing a substantially rectangular masking area without inducing excessive optical losses.

A "distance, perpendicularly measurable from a linear segment" may refer to a length of a shortest linear path, which perpendicularly intercepts the linear segment at a point along an optical path and extends from the linear segment to a reflective surface. Since, in a cross section of an intensity unifying arrangement along any plane, perpendicularly intersecting a linear segment, reflective surfaces of the intensity-unifying arrangement follow a boundary of a rectangle, a distance from the linear segment to any one of the reflective surfaces may always be measurable perpendicularly to said reflective surface.

When a linear path perpendicularly intersecting a linear segment at a point along an optical path and a particular reflective surface does not exist, the distance may be defined as non-measurable at said point for said reflective surface. For example, FIG. 3c shows a cross section of the intensity-unifying arrangement 150 of FIG. 2 along plane IIIc of FIG. 2. In the cross section, three distances 154 are perpendicularly measurable from the linear segment 145 to the first, second, and fourth reflective surfaces $152_1$, $152_2$, $152_4$. In contrast, a distance from the linear segment 145 to the third reflective surface $152_3$ is non-measurable at a point of intersection of the linear segment 145 and the plane IIIc due to the existence of a through-hole in the third reflective surface $152_3$.

A distance being "non-decreasing with increasing distance along an optical path from a radiative element" may refer to the distance being non-measurable, constant, or increasing at each point between any two points on a linear segment, and/or to the distance being a non-decreasing, and possibly at least partially discontinuous and/or undefined, function of distance along the optical path from the radiative element.

For each reflective surface of an intensity-unifying arrangement, a distance, perpendicularly measurable from a linear segment, being non-decreasing with increasing distance along the optical path from a radiative element may enable collecting optical radiation emitted by the radiative element, propagating obliquely with respect to a linear segment, onto a masking element to unify an intensity distribution of optical radiation from the radiative element on the masking element.

Figure 4:
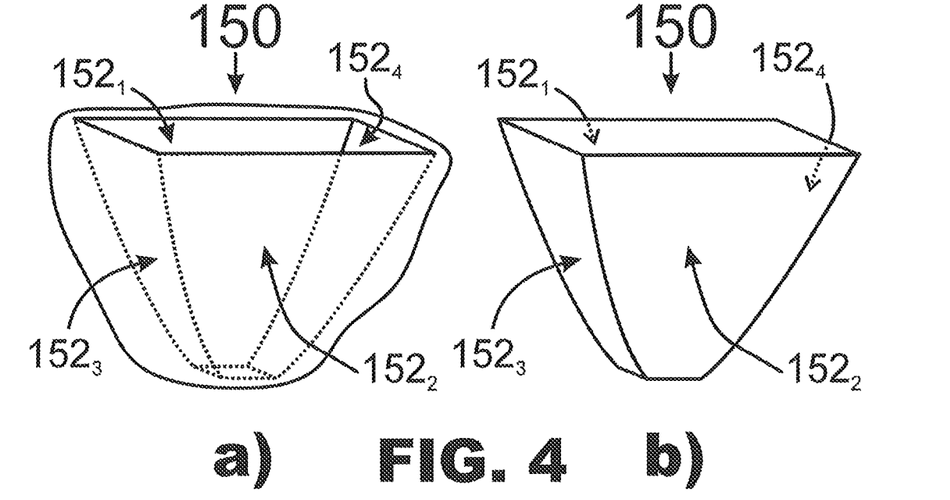
FIG. 4 shows two intensity-unifying arrangements or stereolithography apparatuses.

FIG. 4 illustrates two dissimilar intensity-unifying arrangements 150 of stereolithography apparatuses. In the intensity-unifying arrangement 150 of FIG. 4a, each of the reflective surfaces $152_1$, $152_2$, $152_3$, $152_4$ is arranged on an inner boundary surface of a hollow body. The reflective surfaces $152_1$, $152_2$, $152_3$, $152_4$ define a cavity running through the hollow body. Generally, at least one, preferably each, reflective surface may be arranged on an inner boundary surface of a hollow body. Arranging reflective surfaces on inner boundary surfaces of a hollow body may enable the provision of an intensity-unifying arrangement with a low mass, high transparency, and/or low thermal conductivity.

On the other hand, it the intensity-unifying arrangement 150 of FIG. 4b, each of the reflective surfaces $152_1$, $152_2$, $152_3$, $152_4$ is arranged on an outer boundary surface of a solid body. In some embodiments, at least one reflective surface may be arranged on an outer boundary surface of a solid body. In such embodiments, the solid body may generally comprise any number of holes, through-holes, and/or cavities. Arranging reflective surfaces on outer boundary surfaces of a solid body may enable the provision of a mechanically robust intensity-unifying arrangement.

An exposure arrangement may at least partially be fabricated by injection molding. For example, an exposure arrangement may comprise an injection-molded hollow or solid body, wherein a reflective surface is arranged on an inner or outer boundary surface of the hollow or solid body, respectively.

Figure 5:
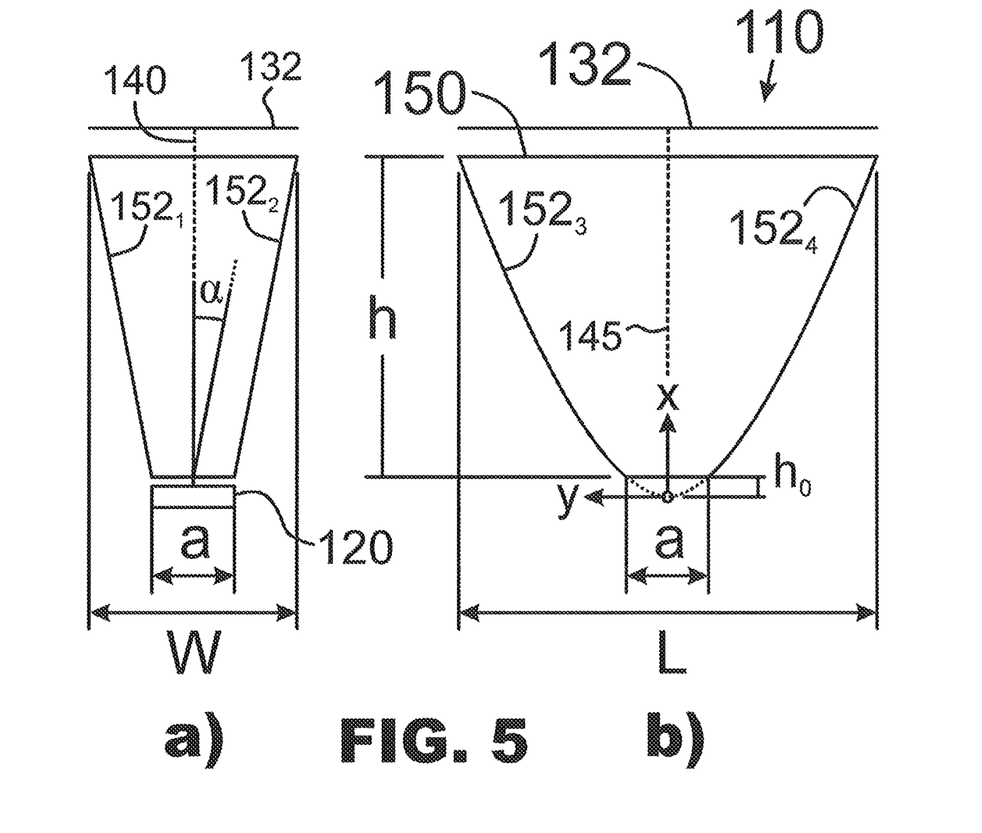
FIG. 5 depicts an intensity-unifying arrangement of a stereolithography apparatus.

FIG. 5 illustrates two schematic, cross-sectional views of an exposure arrangement 110 of a stereolithography apparatus. In FIG. 5a, a radiative element 120 is depicted close to the intensity-unifying arrangement 150. However, in FIG. 5b, the radiative element 120 is omitted for clarity.

In FIG. 5, a two-dimensional Cartesian coordinate system with x- and y-axes has its origin fixed onto an extension of the linear segment 145 towards the radiative element 121 along the optical path 140. The x-axis is directed along the linear segment 145, and the y-axis extends along a plane, which extends along the linear segment 145 and perpendicularly intersects the third or fourth reflective surfaces $152_3$, $152_4$, and towards the third reflective surface $152_3$.

In the embodiment of FIG. 5, the reflective Surfaces $152_1$, $152_2$, $152_3$, $152_4$ extend continuously without through-holes between two planes perpendicular to the x-axis, the two the two planes being positioned at $x=h_0$ and $x=h_0+h$. In other embodiments, different reflective surfaces may extend between different surfaces and/or may extend discontinuously with through-holes.

In the embodiment of FIG. 5, the first and second reflective surfaces $152_1$, $152_2$ are substantially planar. In other embodiments, first and second reflective surfaces may be substantially planar or non-planar.

First and second reflective surfaces being substantially planar may, for example, enable unifying linear intensity distributions of optical radiation emitted by a radiative element on a masking area of a masking element along linear paths parallel to a certain edge of the masking area, especially if an optical path intercepts a center of the masking area perpendicularly. Additionally or alternatively, it may facilitate provision of an intensity-unifying arrangement with improved mechanical stability.

Additionally, in the embodiment of FIG. 5, each of the planar first and second reflective surfaces $152_1$, $152_2$ forms a smaller supplementary angle α measured along a plane, parallel to the linear segment 145 and perpendicular to the first and second reflective surfaces $152_1$, $152_2$, with the linear segment 145.

A reflective surface may form a smaller supplementary angle α with a linear segment in a range from 0° to below 90°, preferably from 50° to 30°, for example, from 10° to 20°. In some embodiments, the smaller supplementary angle α may have a similar or identical value for a first and a second reflective surface. In other embodiments, the smaller supplementary angle α may have dissimilar values for a first and a second reflective surface.

In the embodiment of FIG. 5, a cross section of the third and fourth reflective surfaces $152_3$, $152_4$ along a plane, extending parallel to the linear segment 145 and perpendicular to the third and fourth reflective surfaces $152_3$, $152_4$ has a shape of a part of a conic section, e.g., a circle, ellipse, parabola, or a hyperbola. In other embodiments, third and fourth reflective surfaces may have a s similar or any other suitable shape.

A cross section of third and fourth reflective surfaces along a plane, extending parallel to a linear segment and perpendicular to the third and fourth reflective surfaces, having a shape of a part of a conic section, e.g., a circle, ellipse, parabola, or a hyperbola, may, for example, enable unifying linear intensity distributions of optical radiation emitted by a radiative element on a masking area of a masking element along linear paths perpendicular to a certain edge of the masking area, especially if an optical path intercepts a center of the masking area perpendicularly.

Shapes of the third and fourth reflective surfaces $152_3$, $152_4$ of the embodiment of FIG. 5 may be presented in parametric form as $$y(x)=\pm\sqrt{2Rx-(e+1)x^2},$$

where $x=h_0 \ldots h_0+h$, R is the radius of curvature of the conic section at the origin, and e is the conic constant, also known as the Schwarzschild constant. Additionally, distances, measured parallel to the y-axis, between the third and fourth reflective surfaces $152_3$, $152_4$ at $x=h_0$ and $x=h_0+h$ are designated as a and L, respectively.

FIG. 5a shows a cross section of the exposure arrangement 110 of FIG. 5 along a plane, extending parallel to the x-axis and perpendicularly intersecting the y-axis at the origin. At $x=h_0$ and $x=h_0+h$, distances between the first and second reflective surfaces $152_1$, $152_2$ along a direction parallel to the x- and y-axes are a and W, respectively.

In the embodiment of FIG. 5, a cross section of the reflective surfaces $152_1$, $152_2$, $152_3$, $152_4$ along a plane perpendicularly intersecting the x-axis at $x=h_0$ is square. In other embodiments, said cross section may have a square or any other rectangular shape. Additionally, a cross section of the reflective surfaces $152_1$, $152_2$, $152_3$, $152_4$ along a plane perpendicularly intersecting the x-axis at $x=h_0+h$ is non-square. In other embodiments, said cross section may have a square or any other rectangular shape.

Linear intensity distributions of optical radiation emitted by a radiative element on a masking area of a masking element along linear paths parallel and perpendicular to a certain edge of the masking area may be simultaneously unifiable by providing an intensity-unifying arrangement with planar first and second reflective surfaces as well as third and fourth reflective surfaces with cross sectional shapes of parts of conic sections, especially if an optical path intercepts a center of the masking area perpendicularly. The same effect may also be achievable if all reflective surfaces have cross-sectional shapes of parts of conic sections. Such simultaneous unifying of linear intensity distributions along two perpendicular directions may be achievable irrespective of whether cross sections of the reflective surfaces along planes perpendicularly intersecting the x-axis at $x=h_0$ and $x=h_0+h$ have similar or dissimilar shapes.

In one exemplary embodiment, which may be basically in accordance with that of FIG. 5 and/or FIG. 1a, an exposure arrangement 110 comprises: a radiative element 120, having a 10×10 LED array with an array size of approximately 25 mm×25 mm as a radiation source, for emitting optical radiation at a wavelength range of 405 nm-410 nm with an optical output power of 30 W-35 W and a FWHM angle of approximately 120°; a transmissive liquid crystal element as a masking element 130, having a rectangular masking area 132 with a size of approximately 75 mm×150 mm; an optical path 140 and a linear segment 145 with lengths of approximately 100 mm and approximately 100 mm, respectively, the optical path 140 perpendicularly intersecting a center of radiative element 120 and a center of the masking area 132; and an intensity-unifying arrangement 150, having first and second reflective surfaces $152_1$, $152_2$ arranged on opposite sides of the linear segment 145, and third and fourth reflective surfaces $152_3$, $152_4$ arranged on opposite sides of the linear segment 145.

The reflective surfaces $152_1$, $152_2$, $152_3$, $152_4$ are configured to collect optical radiation from the radiative element 120, propagating obliquely with respect to the linear segment 145, onto the masking area 132. For each of the reflective surfaces $152_1$, $152_2$, $152_3$, $152_4$, a distance, perpendicularly measurable from the linear segment 145, is non-decreasing with increasing creasing distance along the optical path 140 from the radiative element 120.

In a cross section of the intensity-unifying arrangement 150 along any plane, perpendicularly intersecting the linear segment 145, the reflective surfaces $152_1$, $152_2$, $152_3$, $152_4$ follow a boundary of a rectangle, the boundary of a rectangle having two mutually perpendicular symmetry planes with an intersection along the linear segment 145.

The intensity-unifying arrangement 150 comprises an injection-molded hollow body, and each of the reflective surfaces $152_1$, $152_2$, $152_3$, $152_4$ is arranged on an inner boundary surface of the hollow body. Additionally, each of the reflective surfaces $152_1$, $152_2$, $152_3$, $152_4$ is fabricated by sputtering a layer of aluminum onto said hollow body.

In other embodiments, a stereolithography apparatus may comprise an exposure arrangement basically similar to the exposure arrangement 110 of the exemplary embodiment, with the exception that it comprises an intensity-unifying arrangement, having each reflective surface arranged on an outer boundary surface of a solid body. In such case, the dimensions and/or shape of the intensity-unifying arrangement may be adjusted, if necessary, to take into account any effect of refractive index of the solid body on properties of the intensity-unifying arrangement.

In the exposure arrangement 110 of the exemplary embodiment, the reflective surfaces $152_1$, $152_2$, $152_3$, $152_4$ extend continuously between two planes perpendicular to the linear segment 145, the two planes positioned at x=9 mm and x=109 mm. The first and second reflective surfaces $152_1$, $152_2$ are substantially planar, and each of the first and second reflective surfaces $152_1$, $152_2$ forms a smaller supplementary angle α with the linear segment 145 of approximately 15°.

Additionally, a cross section of the third and fourth, reflective surfaces $152_3$, $152_4$ along a plane, extending parallel to the linear segment 145 and perpendicular to the third and fourth reflective surfaces $152_3$, $152_4$, has a shape of a part of a conic section, presentable in parametric form with a radius of curvature R of the conic section at the origin in a range from 6 mm to 9 mm, preferably approximately 7 mm, and a conic constant e in a range from −1.30 to −1.55, preferably approximately −1.35.

In the exemplary embodiment, distances between the third and fourth reflective surfaces $152_3$, $152_4$ at x=9 mm and x=109 mm are approximately 25 mm and 1.50 mm, respectively. Additionally, at x=9 mm and x=109 mm, distances between the first and second reflective surfaces $152_1$, $152_2$ are approximately 25 mm and 76 mm, respectively. Specifically, a cross section of the reflective surfaces $152_1$, $152_2$, $152_3$, $152_4$ along a plane perpendicularly intersecting the x-axis at x=9 mm is square, and a cross section of the reflective surfaces $152_1$, $152_2$, $152_3$, $152_4$ along a plane perpendicularly intersecting the x-axis at x=109 mm is non-square.

With the exposure arrangement 110 of the above embodiment, a uniform intensity distribution of optical radiation emitted by the LED array and incident onto the transmissive liquid crystal element may be achievable. More specifically, an intensity variation of ±3% with respect to an average intensity may be achievable. Additionally, since the uniform intensity distribution produced by the intensity-unifying arrangement is rectangular and has a size corresponding to the size of the transmissive liquid crystal element, the amount of stray light within the exposure arrangement may be reduced, and the energy efficiency of the stereolithography apparatus may be improved.

It is obvious to a person skilled in the art that with the advancement of technology, the basic idea of the invention may be implemented in various ways. The invention and its embodiments are thus not limited to the examples described above, instead they may vary within the scope of the claims.

REFERENCE SIGNS 100 stereolithography apparatus
102 vat
104 resin
106 build platform
108 build surface
110 exposure arrangement
120 radiative element
180 masking element
132 masking area
134 main edge
136 linear intensity distribution
140 optical path
145 linear segment
150 intensity-unifying arrangement
152 reflective surface
154 distance
156 boundary

The invention claimed is:

1. A stereolithography apparatus, having an exposure arrangement comprising:
a radiative element, for emitting optical radiation,
a masking element, having a substantially rectangular masking area, for forming an exposure pattern by partially masking optical radiation from the radiative element,
an optical path between the radiative element and the masking area, the optical path having a linear segment, and
an intensity-unifying arrangement, having a first, a second, a third, and a fourth reflective surface;
wherein the first and second reflective surfaces are substantially planar and are arranged on opposite sides of the linear segment and the third and fourth reflective surfaces are arranged on opposite sides of the linear segment;
wherein the reflective surfaces are configured to collect optical radiation from the radiative element, propagating obliquely with respect to the linear segment, onto the masking area;
wherein a distance from each reflective surface to a perpendicular intersection with the linear segment increases with increasing distance along the optical path from the radiative element;
wherein a cross section of the third and fourth reflective surfaces along a plane, extending parallel to the linear segment and perpendicular to the third and fourth reflective surfaces, has a shape of a part of a conic section; and
wherein, in a cross section of the intensity-unifying arrangement along any plane, perpendicularly intersecting the linear segment, the reflective surfaces follow a boundary of a rectangle.

2. A stereolithography apparatus according to claim 1, wherein the radiative element comprises a radiation source having a radiation pattern with a full-width at half-maximum (FWHM) angle in a range from 110° to 130°.

3. A stereolithography apparatus according to claim 1, wherein the masking element comprises a liquid crystal element.

4. A stereolithography apparatus according to claim 3, wherein the liquid crystal element is a transmissive liquid crystal element.

5. A stereolithography apparatus according to claim 1, wherein the optical path is substantially linear.

6. A stereolithography apparatus according to claim 1, wherein the optical path perpendicularly intersects a center of the masking area.

7. A stereolithography apparatus according to claim 1, wherein any of the reflective surfaces comprises a metal, optionally selected from aluminum, iron, and/or silver.

8. A stereolithography apparatus according to claim 1, wherein the boundary of the rectangle has two mutually perpendicular symmetry planes with an intersection along the linear segment.

9. A stereolithography apparatus according to claim 1, wherein each of the reflective surfaces is arranged on an inner boundary surface of a hollow body.

10. A stereolithography apparatus according to claim 1, wherein each of the reflective surfaces is arranged on an outer boundary surface of a solid body.

11. A stereolithography apparatus, having an exposure arrangement comprising:
a radiative element, for emitting optical radiation,
a masking element, having a substantially rectangular masking area, for forming an exposure pattern by partially masking optical radiation from the radiative element,
an optical path between the radiative element and the masking area, the optical path having a linear segment, and
an intensity-unifying arrangement, having a first, a second, a third, and a fourth reflective surface;
wherein the first and second reflective surfaces are substantially planar and are arranged on opposite sides of the linear segment and the third and fourth reflective surfaces are arranged on opposite sides of the linear segment;
wherein the reflective surfaces are configured to collect optical radiation from the radiative element, propagating obliquely with respect to the linear segment, onto the masking area;
wherein a distance from each reflective surface to a perpendicular intersection with the linear segment increases with increasing distance along the optical path from the radiative element;
wherein a cross section of the third and fourth reflective surfaces along a plane, extending parallel to the linear segment and perpendicular to the third and fourth reflective surfaces, has a shape of a part of a conic section;
wherein, in a cross section of the intensity-unifying arrangement along any plane, perpendicularly intersecting the linear segment, the reflective surfaces follow a boundary of a rectangle; and, wherein the radiative element comprises a square radiation source with a size of approximately 25 mm×25 mm, having a radiation pattern with a full-width at half-maximum (FWHM) angle of approximately 120°;

the masking element comprises a transmissive liquid crystal element, having a rectangular masking area with a size of approximately 75 mm×150 mm;

the optical path is substantially linear, has a length of approximately 100 mm, and perpendicularly intersects a center of the radiative element and a center of the masking area;

the reflective surfaces extend continuously between two planes perpendicular to the linear segment, the two planes positioned approximately 100 mm apart;

the first and second reflective surfaces are substantially planar, each thereof forming a smaller supplementary angle with the linear segment of approximately 15°; and the cross section of the third and fourth reflective surfaces along the plane, extending parallel to the linear segment and perpendicular to the third and fourth reflective surfaces, has a shape of a part of a conic section, presentable in parametric form with a radius of curvature R of the conic section at a vertex of the conic section in a range from 6 mm to 9 mm, and a conic constant in a range from −1.30 to −1.55.

12. A stereolithography apparatus according to claim 1, wherein the radiative element comprises a radiation source having a radiation pattern with a full-width at half-maximum (FWHM) angle of approximately 120°.

13. A stereolithography apparatus according to claim 1, wherein the radiative element comprises a substantially Lambertian radiation source.

14. A stereolithography apparatus according to claim 1, wherein the cross section of the third and fourth reflective surfaces along the plane, extending parallel to the linear segment and perpendicular to the third and fourth reflective surfaces has a shape of a circle, ellipse, parabola, or hyperbola.

15. A stereolithography apparatus, having an exposure arrangement comprising:

a radiative element, for emitting optical radiation, a masking element, having a substantially rectangular masking area, for forming an exposure pattern by partially masking optical radiation from the radiative element, an optical path between the radiative element and the masking area, the optical path having a linear segment, and an intensity-unifying arrangement, having a first, a second, a third, and a fourth reflective surface;

wherein the first and second reflective surfaces are substantially planar and are arranged on opposite sides of the linear segment and the third and fourth reflective surfaces are arranged on opposite sides of the linear segment;

wherein the reflective surfaces are configured to collect optical radiation from the radiative element, propagating obliquely with respect to the linear segment, onto the masking area;

wherein a distance from each reflective surface to a perpendicular intersection with the linear segment increases with increasing distance along the optical path from the radiative element;

wherein a cross section of the third and fourth reflective surfaces along a plane, extending parallel to the linear segment and perpendicular to the third and fourth reflective surfaces, has a shape of a part of a conic section;

wherein, in a cross section of the intensity-unifying arrangement along any plane, perpendicularly intersecting the linear segment, the reflective surfaces follow a boundary of a rectangle; and, wherein the radiative element comprises a square radiation source with a size of approximately 25 mm×25 mm, having a radiation pattern with a full-width at half-maximum (FWHM) angle of approximately 120°;

the masking element comprises a transmissive liquid crystal element, having a rectangular masking area with a size of approximately 75 mm×150 mm;

the optical path is substantially linear, has a length of approximately 100 mm, and perpendicularly intersects a center of the radiative element and a center of the masking area;

the reflective surfaces extend continuously between two planes perpendicular to the linear segment, the two planes positioned approximately 100 mm apart;

the first and second reflective surfaces are substantially planar, each thereof forming a smaller supplementary angle a with the linear segment of approximately 15°; and the cross section of the third and fourth reflective surfaces along the plane, extending parallel to the linear segment and perpendicular to the third and fourth reflective surfaces, has a shape of a part of a conic section, presentable in parametric form with a radius of curvature R of the conic section at a vertex of the conic section of approximately 7 mm, and a conic constant of approximately −1.35.

* * * * *